United States Patent
Thomson et al.

(10) Patent No.: US 11,767,088 B1
(45) Date of Patent: Sep. 26, 2023

(54) WATER MANAGEMENT SYSTEMS FOR PREVENTING WATER INGESTION IN ELECTRICALLY POWERED INFLATION SYSTEMS

(71) Applicant: Air Cruisers Company, LLC, Wall Township, NJ (US)

(72) Inventors: Christian W. Thomson, Manasquan, NJ (US); Thomas W. Swierkocki, Manasquan, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 398 days.

(21) Appl. No.: 16/686,980

(22) Filed: Nov. 18, 2019

Related U.S. Application Data (60) Provisional application No. 62/769,122, filed on Nov. 19, 2018.

(51) Int. Cl.
  *B63C 9/00* (2006.01)
  *B63C 9/04* (2006.01)
  *B63C 9/18* (2006.01)
  *B64D 25/14* (2006.01)
  *B60C 29/00* (2006.01)

(52) U.S. Cl.
  CPC .......... *B63C 9/00* (2013.01); *B63C 9/04* (2013.01); *B63C 9/18* (2013.01); *B63C 9/24* (2013.01); *B64D 25/14* (2013.01); *B63C 2009/0023* (2013.01); *B63C 2009/042* (2013.01)

(58) Field of Classification Search
  CPC .... B63C 9/00; B63C 9/04; B63C 9/18; B63C 9/24; B63C 2009/0023; B63B 45/00; B64D 25/00; B64D 25/14
  USPC .......................................................... 441/80
  See application file for complete search history.

(56) References Cited

U.S. PATENT DOCUMENTS

| | | | | |
|---|---|---|---|---|
| 4,579,536 A | * | 4/1986 | Cameron | B63C 9/04 441/80 |
| 4,651,792 A | * | 3/1987 | Taylor | B60C 23/12 417/233 |
| 6,494,756 B2 | * | 12/2002 | Michaud | B63C 9/24 441/41 |
| 6,642,906 B1 | * | 11/2003 | Machalek | H01Q 3/08 348/375 |
| 9,637,210 B2 | * | 5/2017 | Thomson | B63C 9/18 |

* cited by examiner

Primary Examiner — Lars A Olson
(74) Attorney, Agent, or Firm — Kilpatrick Townsend & Stockton LLP (57) ABSTRACT

Systems to prevent water ingestion during use of an electrically powered inflation system for an inflatable device in order to ensure that the inflatable device remains either upright in the water during the inflation process, or that prevents water from entering the inflation system air intake during the inflation process, or combinations thereof.

19 Claims, 8 Drawing Sheets

Closed Connection

FIG. 2A

Open Connection

FIG. 2B

Switch On    Switch Off

WATER MANAGEMENT SYSTEMS FOR PREVENTING WATER INGESTION IN ELECTRICALLY POWERED INFLATION SYSTEMS

This application claims the benefit of U.S. Provisional Application Ser. No. 62/769,122, filed Nov. 19, 2018 titled "Water Management Systems for Preventing Water Ingestion in Electrical Powered Inflation Systems," the entire contents of which are hereby incorporated by reference.

FIELD OF THE DISCLOSURE

Embodiments of the present disclosure relate generally to prevent water ingestion during use of electrically powered inflation systems. The electrically powered inflation systems described are primarily intended for use in emergency situations. For example, they are used to inflate evacuation slides, life rafts, and/or slide/rafts required to evacuate an aircraft. Many such evacuations are water evacuations, meaning that the inflatable systems must inflate over, near, and/or on water. The present disclosure provides various systems that may be employed with an electrically powered inflation system for an inflatable device in order to ensure that the inflatable device remains either upright in the water during the inflation process, or that prevents water from entering the inflation system air intake during the inflation process, or combinations thereof.

BACKGROUND

Inflation systems for safety systems, such as evacuation slides, life rafts, and/or slide/rafts, which are required to be carried on board aircraft, generally use compressed gas for inflation. However, the present inventors have designed an electrically powered inflation system usable with inflation safety systems. The electrically powered inflation system uses a compressor wheel mounted with respect to a motor mount and a compressor housing. The compressor housing has an air intake. An electric motor is configured to impart rotational speed to the compressor wheel. The system converts ambient air into a high-pressure airflow and transmits the high-pressure airflow into the inflatable structure, causing a rapid inflation of the inflatable structure. These features are described and shown in more detail in U.S. Pat. No. 9,637,210 titled "Electric Powered Inflation System," which application shares a common assignee with this application and which contents are hereby incorporated by reference.

These inflation systems are primarily intended for use in emergency situations, such as inflating evacuation slides, life rafts, and/or slide/rafts required to evacuate an aircraft. Many such evacuations are water evacuations, meaning that the inflatable systems must inflate over, near, and/or on water. The improvements described herein provide various systems that may be employed with an inflation system used in connection with an inflatable device in order to ensure that the inflatable device remains either upright in the water during the inflation process, or that prevents water from entering the inflation system air intake during the inflation process, or combinations thereof.

BRIEF SUMMARY

Embodiments of the present disclosure provide a water ingestion prevention system for an inflator used in connection with an inflatable device, the water ingestion prevention system comprising one or more buoyancy devices associated with the inflator. The one or more buoyancy devices may comprise a buoyancy device associated with a self-righting container. In this example, the self-righting container may incorporate a weight positioned at an intended lowermost portion. It is possible for the inflatable device to be packed within the self-righting container in a way that focuses weight of the inflatable device at an intended lowermost portion. In certain examples, the inflator may be positioned near the one or more buoyancy devices, such that the inflator is positioned out of water.

It is possible for the one or more buoyancy devices to comprise a low density material. It is possible for the one or more buoyancy devices to comprise an inflatable structure. It is possible for the one or more buoyancy devices to comprise a water barrier positioned around the inflator. It is possible for the one or more buoyancy devices to comprise an inflator buoyancy device.

In other examples, the one or more buoyancy devices may comprise a cone-shaped buoyancy device comprising a cone wall and a cone base at which the inflator is positioned. There may be one or more scalloped edges at ends of the cone wall. There may be one or more openings in the cone wall.

In other examples, the one or more buoyancy devices may comprise a floating multiport manifold. It is also possible for the one or more buoyancy devices to comprise a snorkel-like tube. The snorkel-like tube may have a buoyancy device at its end.

Further embodiments provide a water ingestion prevention system for an inflator used in connection with an inflatable device, the water ingestion prevention system comprising one or more sensors associated with the inflator. The one or more sensors may comprise water presence sensors, pressure sensors, position sensors, float switches, angle sensors, attitude sensors, accelerometers, or any combination thereof.

BRIEF DESCRIPTION OF THE DRAWINGS

FIGS. 4A-4D illustrate side perspective views of a self-righting container with a buoyancy device.

DETAILED DESCRIPTION

Embodiments of the present disclosure provide systems that may be employed with an inflation system used in connection with an inflatable device. These systems are designed to ensure that the inflatable device remains either upright in the water during the inflation process, or prevents water from entering the inflation system air intake during the inflation process, or combinations thereof.

Figure 1A:
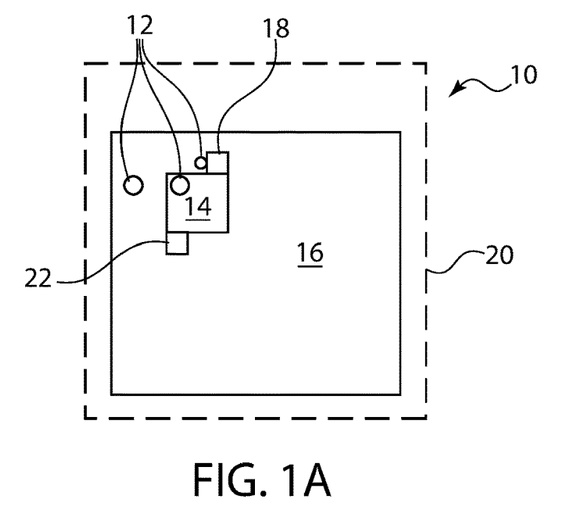
FIG. 1A shows a schematic illustration of one embodiment of the disclosure employing one or more sensors.
Figure 1B:
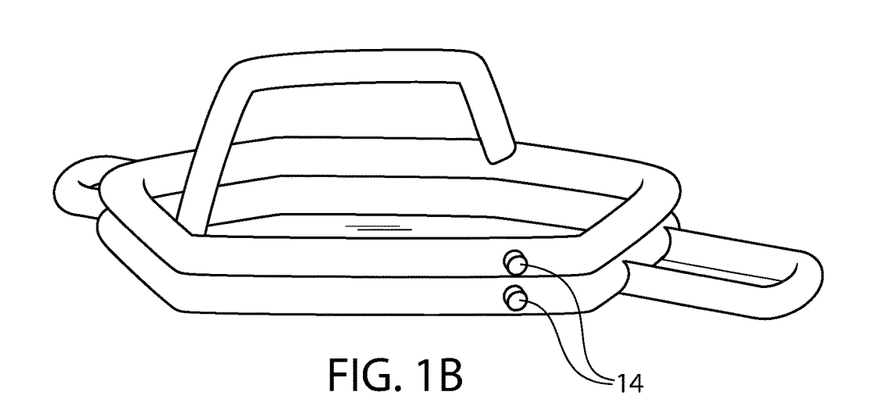
FIG. 1B shows an inflated life raft illustrating the location of the inflator.
Figure 1C:
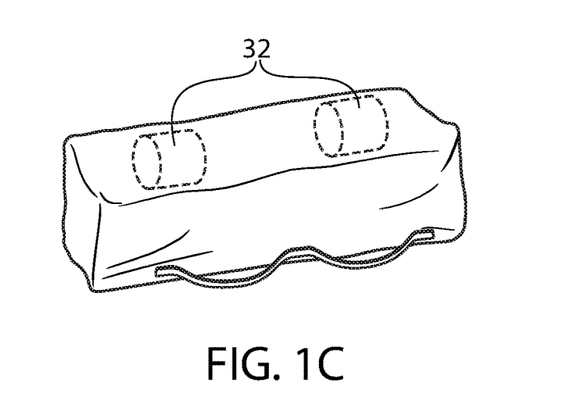
FIG. 1C shows a packed lift raft illustrating the location of the inflator.

One example of a water ingestion prevention system 10 illustrated by FIG. 1A provides one or more sensors 12 that accompany an inflator 14 of an inflatable device 16. FIG. 1B illustrates an example of where the inflator(s) 14 may be located with respect to the inflatable device. FIG. 1C illustrates an example of a packed inflatable device as described in more detail below. Exemplary sensors 12 that may be used in accordance with this disclosure include water presence sensors, pressure sensors, position sensors, float switches, angle sensors, attitude sensors, accelerometers, any other appropriate sensors, or any combination thereof.

Figure 13:
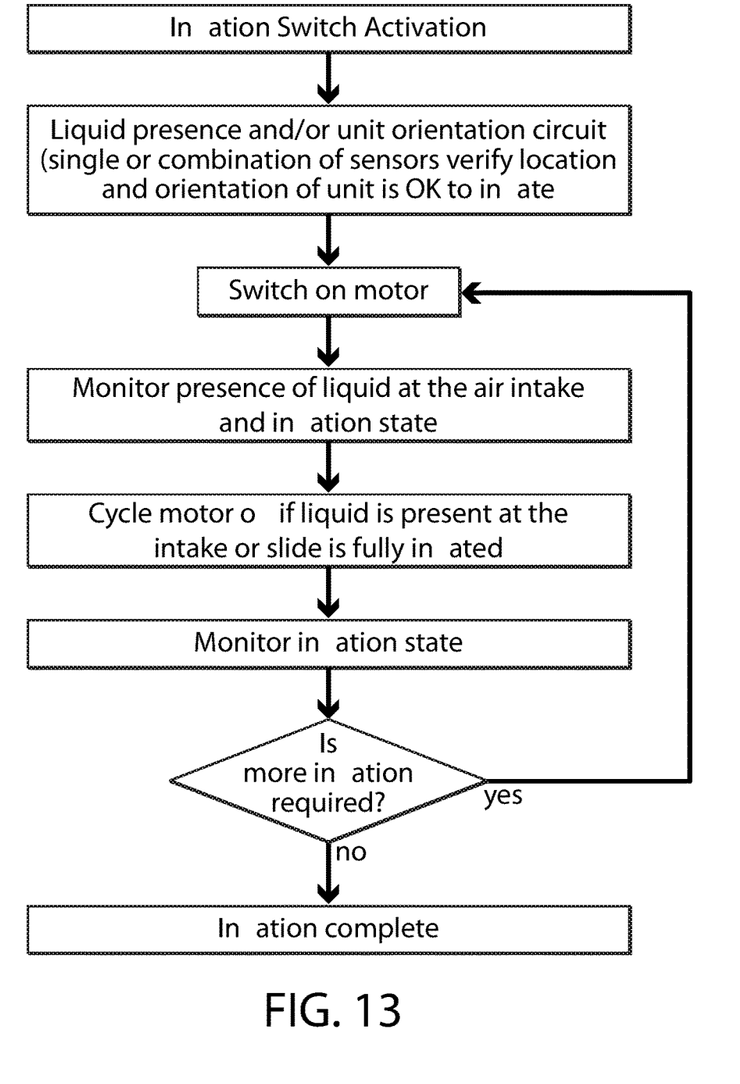
FIG. 13 is a flowchart illustrating control logic steps for communication between one or more water sensors and the inflation motor.

In a specific example, one or more water sensors 12 (which may also be referred to as water presence sensors 12) may be wired to a microcontroller, which can either turn the motor off when the presence of water is sensed and/or turn the motor on when water is not sensed. The microcontroller can allow the motor to turn on if no water is detected. The one or more water sensors 12 can function to prevent the inflator 14 from turning on if either a portion of the intake inlet or the complete intake inlet 18 is in contact with water. A flowchart illustrating this control logic is provided at FIG. 13. In that figure, liquid presence and the inflation state is sensed and depending upon the presence of liquid and/or the inflation state of the inflatable device, the motor may be switched on when the inflator is out of water and when more inflation is needed.

The one or more water sensors 12 can be attached to the inflator 14 itself, the intake inlet 18, a container 20 holding the inflatable device, the inflatable device 16 itself, or any other location that may be in contact with water during use of the inflatable device. An exemplary schematic of these embodiments is illustrated by FIG. 1A. An inflator control system 22 may be provided that is configured such that the inflator 14 cannot be activated if any of the at least one water sensors 12 is in contact with water.

For example, there may be provided a single water sensor 12 that is positioned on an upper portion of a container holding an inflatable device, on or near the inflator. If this water sensor 12 senses the absence of water, this can indicate to the microcontroller that the inflator is out of the water and safe to operate. The microcontroller can be configured to turn the motor on. In another example, there may be provided a single water sensor 12 that is positioned on a lower portion of a container holding an inflatable device, on an opposite wall of where the inflator is located. If this water sensor senses that it is positioned in water (i.e., if it senses the presence of water), this can indicate to the microcontroller that because that sensor is in the water, the inflator (positioned on an opposite side of the container) must be out of the water and safe to operate. In this instance, the microcontroller can be configured to turn the motor on. In an even further embodiment, first and second water sensors 12 may be provided. A first water sensor may be positioned on an upper portion of the container, and a second water sensor may be positioned on a lower portion of the container. When the first sensor senses the absence of water and the second sensor senses the presence of water, this can mean that the container is in the water and oriented properly for activation of the inflator motor. If both of the sensors sense the presence of water, this can mean that the container is fully submerged, and the inflator will not be activated until the water sensor nearest the inflator detects that it has been cleared of water. Once an acceptable inflation condition has been sensed, the microcontroller can thus be configured to turn the motor on when it senses an appropriate sensor configuration.

Figure 2A:
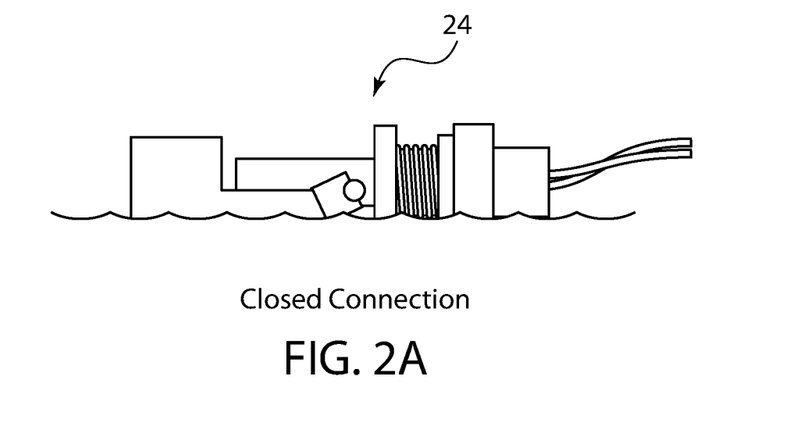
FIG. 2A shows an embodiment of a float switch in a closed connection.
Figure 2B:
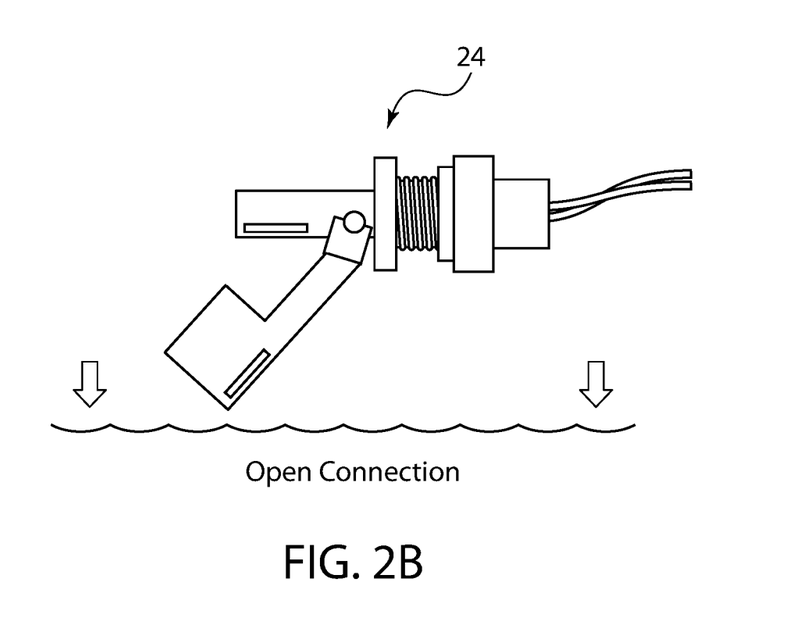
FIG. 2B shows an embodiment of a float switch in an open connection.

It is also possible to provide a float switch 24 that controls an inflator 14 based on the level of water in which the unit is floating. Additionally, a float switch 24 type of sensor could also be used as a position sensor as described below. For example, if the unit were positioned upside down, the float switch 24 would fall into the same position as it would fall if the float switch 24 was submerged in water. The float switch 24 could employ either a magnet or a mechanical switch to act as a relay. As illustrated by the schematic FIGS. 2A and 2B, the float switch 24 may have a closed connection, indicating that the float switch 24 is submerged in water (FIG. 2A) or an open connection, indicating that the float switch 24 is not submerged (FIG. 2B).

Another type of sensor 12 that may be used in connection with this disclosure may be one or more positional sensors 12. Positional sensors 12 that prevent the inflator 14 from turning on if the inflator 14 or inflatable device 16 is not oriented correctly may be used. An inflator 14 that is not oriented correctly may ingest water if allowed to run. A positional sensor 12 can be attached to the inflator 14 itself, the intake inlet 18, the container 20, the inflatable device 16, or any other location that allows the positional senor 12 to detect the position of the inflator 14 or inflatable device 16. The inflator control system 22 may be configured such that the inflator 14 cannot be activated if the positional sensor 12 is providing feedback that the inflator 14 or inflatable device 16 is not oriented correctly.

Exemplary positional sensors could include but are not limited to an attitude sensing chip or a multi axis accelerometer. These could be wired to a microcontroller to direct the inflator 14 to turn on or off, based upon its orientation.

Figure 3:
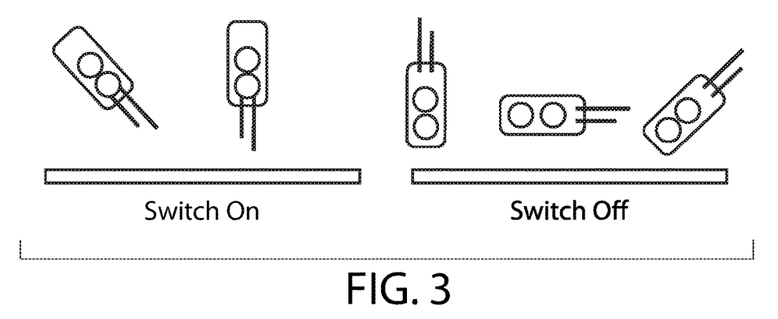
FIG. 3 shows various tilt switch orientation options.

This type of sensor may be similar to the sensors that multirotor drones use to control their orientation. Additionally or alternatively, a tilt switch could also be used to trigger inflation based on the attitude of the inflatable device 16 or container 20. Exemplary tilt switches and their orientations are illustrated by FIG. 3.

Any of the aforementioned switches or sensors could be provided in the appropriate tolerance and materials in order to work with the types of inflatable devices disclosed herein.

Figure 4A:
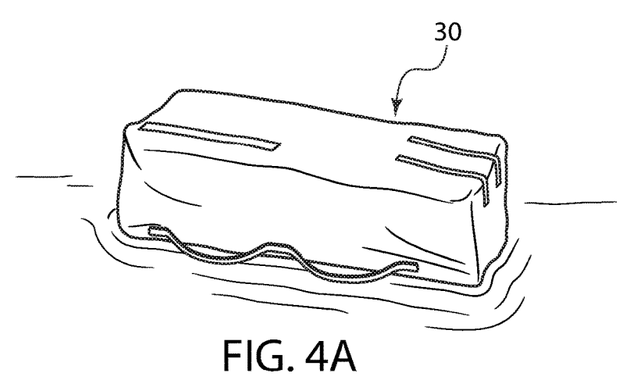
FIG. 4A shows the container positioned in water.

Another example of a system to prevent water ingestion into the inflation system is to provide the inflatable device packed within a self-righting container 30. As background, when a life raft or other inflatable device must be inflated in water, the container may initially be floating, as illustrated by FIG. 4A. When the inflatable device is inflated, it is desirable that components of the inflator 14 remain above water. Accordingly, one embodiment relates to packing a life raft or other inflatable device in a container 30 with a buoyancy device 32. FIG. 1C illustrates an example of a packed inflatable device showing one potential location of where one or more buoyancy devices 32 may be located in the packed container. Referring back to FIG. 4A, in a specific example, the components of the inflatable device may be packed so that a buoyancy device 32 causes the container 30 to rotate in the water. In one example, the raft can be packed into a tubular container so that the center of mass of the packed raft is offset from the centroid and provides a righting moment to orient the pack in an upright configuration (with the inflators near the top and out of the water). Exemplary buoyancy device 32 materials include materials that have a lower density than water. When the buoyancy device 32 has a lower density than the rest of the container 30, the device's center of mass shifts away from the buoyancy device 32. As a result, when placed in water, container 30 will orient itself with buoyancy device 32 upwards.

Exemplary potential buoyancy device materials include but are not limited to foam, polypropylene, polystyrene, polyurethane, an inflatable material, combinations thereof, or any other appropriate buoyant material. One type of foam that may be used is closed cell foam. In a further embodiment, the buoyancy device 32 itself is inflatable. When the container 30 of the life raft or other inflatable device is in the water and the buoyancy device 32 begins inflating, it causes the container 30 itself to rotate to be right side up in the water. Lower density material can be added to various locations near the perimeter of the container in order to alter the center of mass and accomplish this self-righting.

Figure 4B:
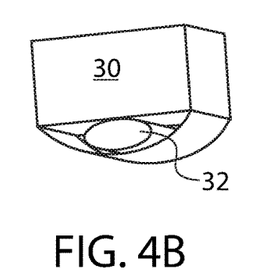
FIG. 4B illustrates one potential location for a buoyancy device.
Figure 4C:
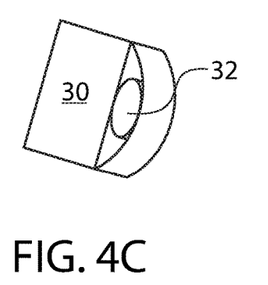
FIG. 4C illustrates the buoyancy device functioning to rotate the container.
Figure 4D:
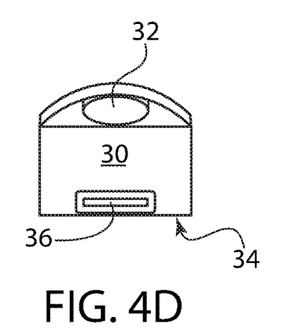
FIG. 4D illustrates the buoyancy device positioning the container on the water as desired, as well as an optional additional weight positioned at the lowermost portion of the container.

In one example, the buoyancy device 32 may be a float positioned with respect to the container 30, positioned with respect to the inflatable device packed within the container 30, or both. In other examples, the buoyancy device 32 itself is inflatable. Regardless of the type of device used, the buoyancy device 32 may be positioned within the container without being secured to the container. In another example, the buoyancy device 32 may be secured directly to the container pack material. The buoyancy device 32 may extend the length of the container 30. Additionally or alternatively, a plurality of buoyancy devices 32 may be positioned along various portions of the length of the container 30. FIGS. 4B-4D illustrate a self-righting container 30 with a buoyancy device 32 that functions to rotate the container 30 in water so that the buoyancy device 32 "pulls" or moves the portion of the container containing the inflator (not shown in FIGS. 4A-4D), moving the inflator out of the water.

In a specific example, the buoyancy device 32 may be an inflatable buoyancy device 32 positioned to rotate the container pack into the desired orientation. Use of an inflatable buoyancy device 32 may be as follows: the raft may be packed with a deflated buoyancy device located in a position where when inflated would significantly alter the center of mass of the container pack and provide a righting moment that would rotate the pack into the desired orientation for inflation. Then, when the inflation is initiated (which may be via a pull cord, switch or another device), this may first cause the buoyancy device to inflate using compressed gas, gas generator, chemical reaction, or some other means. This inflation may then cause the container pack to become or remain oriented to a position at which a sensor could verify that the attitude is acceptable for inflation. Once this occurs, a sensor may trigger the inflation of the raft.

Additionally or alternatively, the inflatable device may be packed so that the weight of the inflatable device is concentrated in the lowermost portion 34 of the container 30, such that the portion of the container that is intended to be the lowermost portion 34 is caused to initially be positioned face down in the water. This can help ease the job of the buoyancy device 32. Additionally or alternatively, it is possible to provide an additional weight 36 at the intended lowermost portion 34 of the container 30, as illustrated by FIG. 4D. Rather than (or in addition to) using an extra weight, it is possible to incorporate a weight-carrying feature that would otherwise already need to be included with the packed raft at the intended lowermost portion 34 of the container 30. Non-limiting examples of such features include a battery, electrical controls, a survival kit, one or more portions of the motor, or any other elements that need to be incorporated into the container but that naturally carry weight. This can ensure that the lowermost-intended portion 34 remains facing down in the water. This consequently means that the portion intended to remain above water does so. As described above, use of a cylindrical raft bag/container may also help the natural rotation (assisted by the buoyancy device 32) that needs to occur within the water for proper operation of the inflator.

Figure 5:
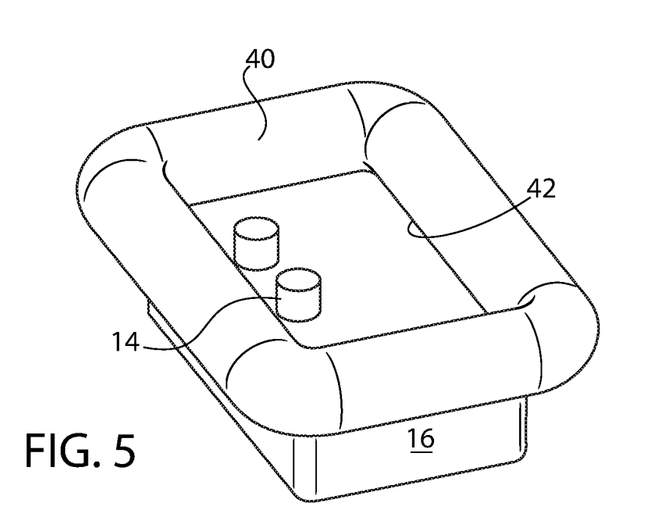
FIG. 5 illustrates a side perspective view of an inflatable device with a water barrier protecting the inflator.

In a further embodiment illustrated by FIG. 5, the buoyancy device is shaped to form a dam or a water barrier 40 around the inflator 14 in order to prevent water from entering the inflator 14. As shown, a water barrier 40 may be formed by one or more tubular beams positioned around at least a portion of a perimeter 42 of the inflatable device 16. An alternative water barrier 40 may be formed by a plurality of floats positioned around the inflator 14. Any of the above described buoyancy device material options are possible for use and considered within the scope of this embodiment as well. The general goal with this version is to create an obstruction between the inflator 14 and the water in which the inflatable device 16 may be floating.

In a further embodiment, the lacing cover or other portions of the container itself may be made of a buoyant material. The buoyant material may only be provided at the portion that is intended to remain right side up in the water.

In an alternate embodiment, rather than the buoyancy device being associated with the container or the inflatable device, it is possible for the inflator 14 of the inflatable device itself to have its own buoyancy device. This buoyancy device may be made of any of the above described materials as well; it may be a float material or an inflatable material. In testing, the buoyancy device 32 was similar in shape and size to a life vest, however, it is possible for the buoyancy device 32 to be an elongated tubular component, a square component, a flat mat component, one or more round floats, or any other appropriate shape. It is possible for a water sensor and/or positional sensor to accompany the self-righting container system 30, such that it only triggers the inflator system to turn on once the buoyancy device 32 has appropriately positioned the inflator system so that it is out of the water.

Figure 6A:
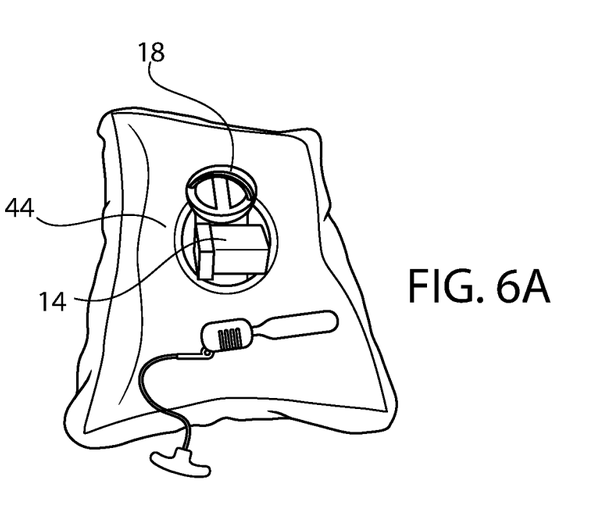
FIG. 6A illustrates a top perspective view of one embodiment of a buoyancy device for an inflator.
Figure 6B:
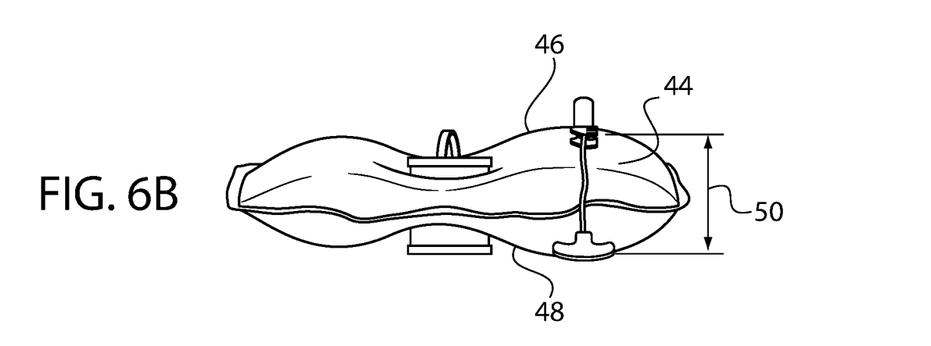
FIG. 6B illustrates a side perspective view of the buoyancy device embodiment of FIG. 6A.
Figure 14:
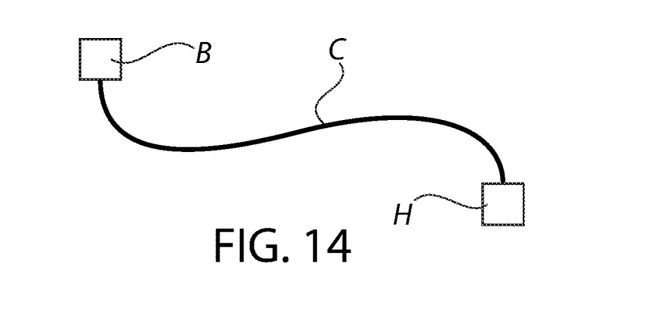
FIG. 14 illustrates a schematic of an air intake inlet associated with a buoyancy device that is separate from an inflator/motor housing but in fluid communication therewith via a conduit.

One example of this inflator buoyancy device embodiment is illustrated by FIGS. 6A and 6B. This embodiment maintains the intake inlet 18 of the inflator 14 rotated up and out of the water while it is operating. The inflator 14 may be associated with the inflatable device 16 via one or more inflation conduits (not shown), such that inflation air may be delivered to the inflatable device 16 while the inflator 14 is physically separate therefrom. For example, a conduit C may attach the floating air intake inlet associated with a buoyancy device B to the inflator housing H (which may be positioned elsewhere, or even under the water). One example of this is illustrated by FIG. 14. An upper surface 46 of the buoyancy device 44 provides open space above the water and can prevent water ingestion by the inflator system. The lower surface 48 of the buoyancy device 44 floats on the water. The distance 50 between the upper surface 46 and the lower surface 48 may be modified depending upon various customer requirements. It is also possible for one or more water sensors and/or one or more positional sensors to accompany the inflation system of the buoyancy device 44, such that it only triggers the inflator 14 to turn on once the buoyancy device 44 has appropriately positioned the inflator 14 so that it is out of the water.

Figure 7A:
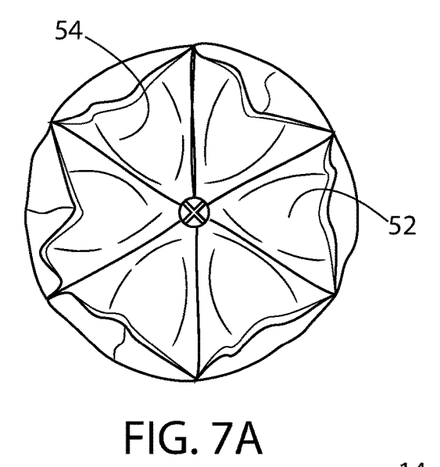
FIG. 7A illustrates a front perspective view of a cone-shaped buoyancy device.
Figure 7B:
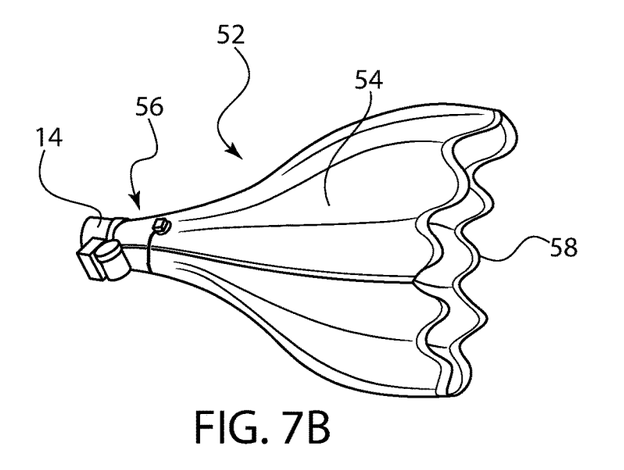
FIG. 7B illustrates a side perspective view of the cone-shaped buoyancy device of FIG. 7A.

In a further embodiment, the buoyancy device that prevents the inflator 14 from ingesting water may be a cone-shaped buoyancy device 52. Exemplary images are shown by FIGS. 7A and 7B. In this embodiment, the cone-shaped buoyancy device 52 is an inflatable cone. The cone wall 54 protects an inflator 14 that may be positioned at the cone base 56. In this example, the buoyancy of the inflatable cone-shaped buoyancy device 52 forces the inflator 14 out of the water during use. The cone-shaped wall 54 is designed to prevent waves from crashing into the inflator 14 during potential rough weather. Alternatively, the weight of the inflator 14 may keep the inflator 14 at an intended lower most portion while the cone walls 54 extend above the water and create a shield from waves. An additional weight may be positioned at or near the cone base 56 to ensure that the cone wall 54 extends upright, above the water. In this embodiment, even if the cone-shaped buoyancy device 52 lays largely horizontally, as long as it's open cone end is at or above the surface of the water, the inflator 14 may be able to be provided with enough air to operate properly. The weight of the motor may help right the device 52.

Figure 8:
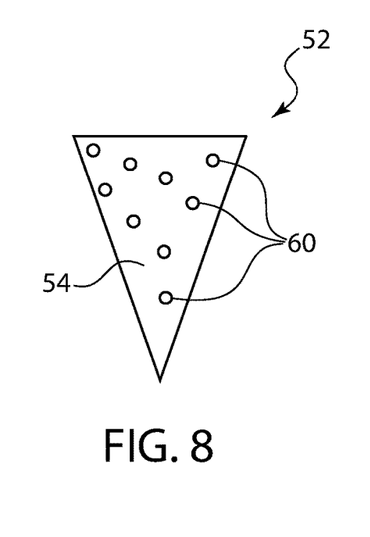
FIG. 8 illustrates a side plan view of a cone-shaped buoyancy device comprising one or more openings in its cone wall.

Optional scalloped edges 58 may be provided at ends of the cone walls 54. In the event that the cone-shaped buoyancy device 52 inflates face down in the water, air intake remains possible through one of the scalloped edges 58. Additionally or alternatively, it is possible to provide a plurality of openings 60 in the cone wall 54 (with each opening 60 being sealed around its perimeter to maintain an airtight cone) for air intake in such similar conditions. An exemplary image is shown by FIG. 8.

Figure 9:
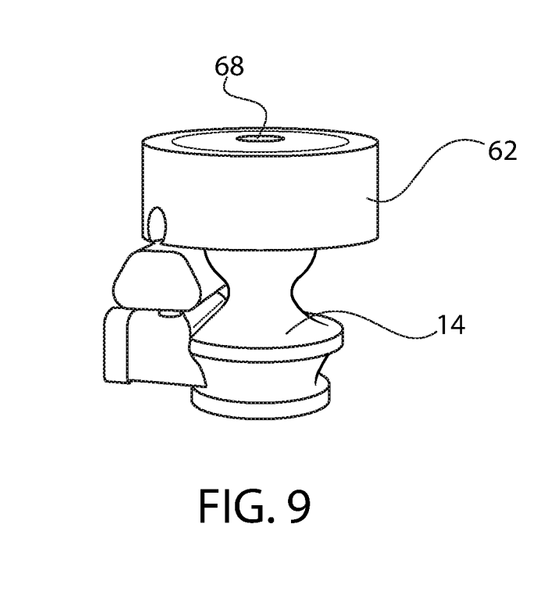
FIG. 9 illustrates a side perspective view of an inflator fitted with a multiport manifold.
Figure 10A:
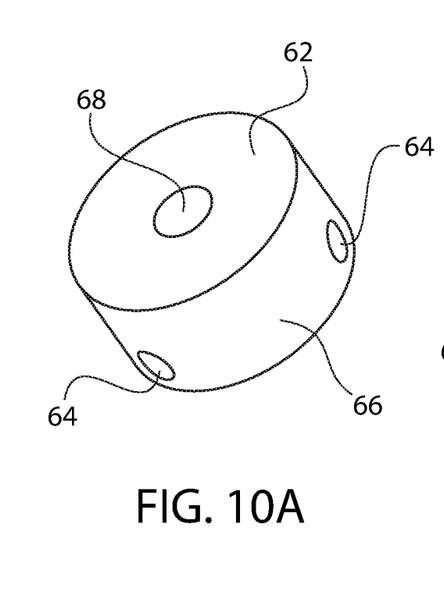
FIG. 10A illustrates a top perspective view of the multiport manifold of FIG. 9.
Figure 10B:
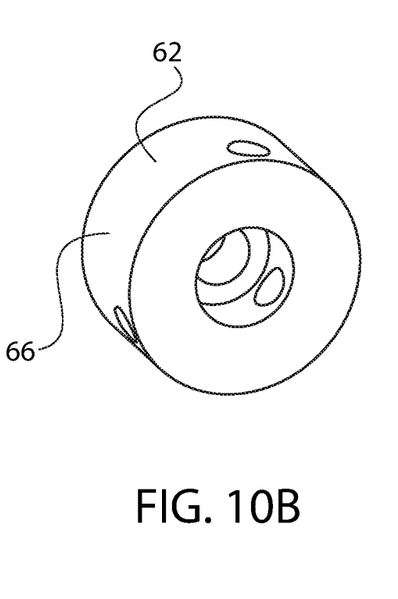
FIG. 10B illustrates a side perspective view of the multiport manifold of FIG. 9.

In alternate embodiments, it is desirable to maintain the air intake inlet of the inflator 14 above water. One way in which this may be done is to provide a multiport manifold 62 on the air intake. One example is illustrated by FIG. 9. The multiport manifold 62 may be material similar to the buoyancy device 32 described above. This means that the multiport manifold 62 may be a floating multiport manifold 62. In the examples illustrated by FIG. 9 and FIGS. 10A and 10B, the multiport manifold 62 is formed as a circular foam float. It may resemble a cylindrical or ring-shaped cover positioned around the circumference near the top of the inflator 14 with a number of holes positioned therein. It should be understood, however, that other shapes and materials are possible and considered within the scope of this disclosure. The multiport manifold 62 may have multiple air inlet ports 64. In the example shown, there are three equally spaced air inlet ports 64 along a perimeter surface 66 of the manifold 62. Additionally, there is an upper air port 68 positioned along an upper surface of the manifold 62. If one or more of the air inlet ports 64, 68 is covered by water, there will not be enough vacuum to suck water into the inflator 14 as long as at least one of the ports 64, 68 is exposed directly to air.

Figure 11A:
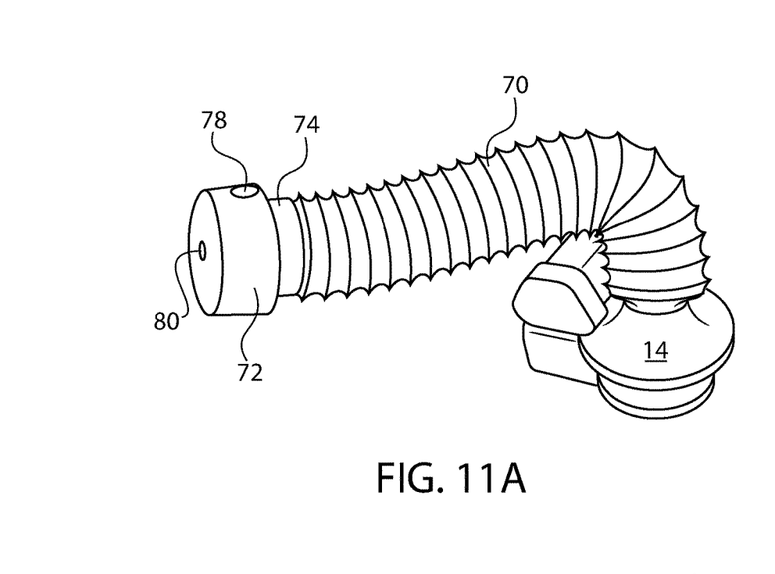
FIG. 11A illustrates a side perspective view of a snorkel-like tube embodiment that may be positioned with respect to an inflator.
Figure 11B:
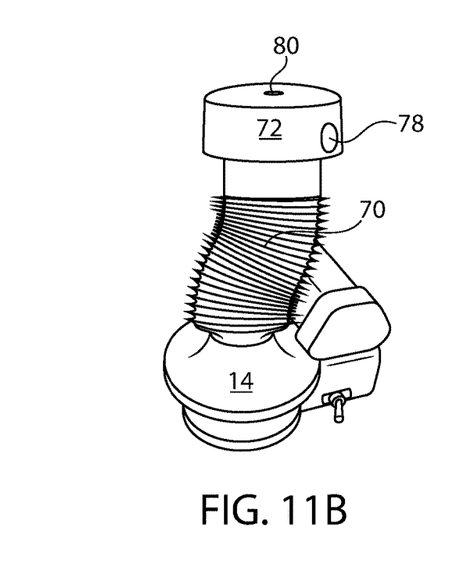
FIG. 11B illustrates a side perspective view of the snorkel-like tube embodiment of FIG. 11A, with the tube in a compressed position.

A further embodiment may provide a snorkel-like tube 70 on the air intake of the inflator 14. One example is illustrated by FIGS. 11A and 11B. The snorkel-like tube 70 may have a float or other type of buoyancy device 72 positioned at its end 74. This can help define an airway channel between the end 74 of the snorkel-like tube 70 and the inflator 14. The float or buoyancy device 72 will function to keep the end 74 of the snorkel-like tube 70 above water. The float or buoyancy device 72 may have a single inlet hole 78 or multiple inlet holes 80 similar to the multiport manifold described previously. One non-limiting example of a snorkel-like tube 70 may resemble ducting material that can expand and retract. One optional feature is to provide self-closing flaps, which can function to prevent air intake into the inlet holes 78, 80 if the buoyancy device 72 experiences a water rush. These may be simple flaps, a gate valve, a flapper valve, or any other appropriate option. In use, regardless of where the inflator 14 is located, the float or buoyancy device 72 functions to keep air intake happening at the surface of water so that it pulls in air, rather than water.

Figure 12:
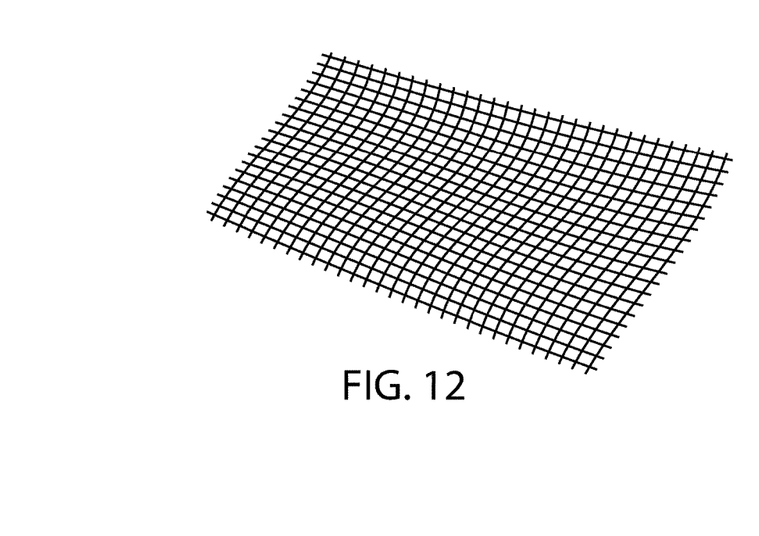
FIG. 12 illustrates a top plan view of one embodiment of a mesh or other type of foreign object debris protection that may be used in connection with this disclosure.

In any of the above-described examples, it is possible to prevent foreign object debris ingestion by providing a mesh layer, lattice layer, slat layer or other porous material or structure over the inflator, over the cone-shaped buoyancy device, over the float opening, or any combination thereof. The mesh, lattice, or slats may be rigid, flexible, or any other appropriate material or structure covering the inlet that allows airflow but that would function to prevent foreign object debris from interfering with inflation. One exemplary but non-limiting option is illustrated by FIG. 12. It is possible to use any of these water management concepts individually or in combination with one another.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Changes and modifications, additions and deletions may be made to the structures and methods recited above and shown in the drawings without departing from the scope or spirit of the invention disclosure and the following claims.

What is claimed is:

1. A water ingestion prevention system for an automatic electrically-powered inflator used in connection with an inflatable device, the automatic electrically-powered inflator comprising an inlet open to the atmosphere and configured to automatically inflate the inflatable device upon activation of the automatic electrically-powered inflator, the water ingestion prevention system comprising:
   one or more buoyancy devices associated with the automatic electrically-powered inflator and configured to maintain or move the inlet of the automatic electrically-powered inflator above water during inflation,
   wherein the one or more buoyancy devices comprise a water barrier positioned around the automatic electrically-powered inflator.

2. The system of claim 1, wherein the one or more buoyancy devices comprise a buoyancy device associated with a self-righting container.

3. The system of claim 2, wherein the self-righting container further comprises a weight positioned at an intended lowermost portion.

4. The system of claim 2, wherein the inflatable device is packed within the self-righting container in a way that focuses weight of the inflatable device at an intended lowermost portion.

5. The system of claim 2, wherein the automatic electrically-powered inflator is positioned near the one or more buoyancy devices, such that the inlet of the automatic electrically-powered inflator is positioned out of water.

6. The system of claim 1, wherein the one or more buoyancy devices comprise a material sufficient to position the inlet of the automatic electrically-powered inflator out of the water.

7. The system of claim 1, wherein the one or more buoyancy devices comprise an inflatable structure.

8. The system of claim 1, wherein the one or more buoyancy devices comprises an inflator buoyancy device.

9. The system of claim 1, wherein the one or more buoyancy devices comprise a cone-shaped buoyancy device comprising a cone wall and a cone base at which the automatic electrically-powered inflator is positioned.

10. The system of claim 9, further comprising one or more scalloped edges at ends of the cone wall.

11. The system of claim 9, further comprising one or more openings in the cone wall.

12. The system of claim 1, wherein the one or more buoyancy devices comprise multiple air inlet ports.

13. The system of claim 1, wherein the one or more buoyancy devices comprise a snorkel-like tube.

14. The system of claim 13, wherein the snorkel-like tube comprises a buoyancy device at its end.

15. A water ingestion prevention system used in connection with an inflatable device, the water ingestion prevention system comprising:
   an inflator comprising an inlet open to the atmosphere; and
   one or more sensors associated with the inlet of the inflator, wherein if the inflator will ingest water, the one or more sensors provide a signal to the inflator not to inflate the inflatable device.

16. The system of claim 15, wherein the one or more sensors comprise water presence sensors, pressure sensors, position sensors, float switches, angle sensors, attitude sensors, accelerometers, or any combination thereof.

17. The system of claim 1, further comprising at least one sensor, wherein the at least one sensor is configured to provide a signal to the automatic electrically-powered inflator not to inflate the inflatable device based on a detection of liquid by the at least one sensor.

18. The system of claim 1, wherein the automatic electrically-powered inflator is a compressor, and wherein the automatic electrically-powered inflator is coupled to the inflatable device via an air communication conduit.

19. A water ingestion prevention system for an automatic electrically-powered inflator used in connection with an inflatable device, the automatic electrically-powered inflator comprising an inlet open to the atmosphere and configured to automatically inflate the inflatable device upon activation of the automatic electrically-powered inflator, the water ingestion prevention system comprising:
   one or more buoyancy devices associated with the automatic electrically-powered inflator and configured to maintain or move the inlet of the automatic electrically-powered inflator above water during inflation,
   wherein the one or more buoyancy devices comprise a buoyancy device associated with a self-righting container, and
   wherein the inflatable device is packed within the self-righting container in a way that focuses weight of the inflatable device at an intended lowermost portion.

* * * * *